Nov. 4, 1969
A. A. BERG ETAL
3,476,019
AIR-ASSISTED EMERGENCY SPRING BRAKE ASSEMBLY
Filed Sept. 8, 1967
2 Sheets-Sheet 1
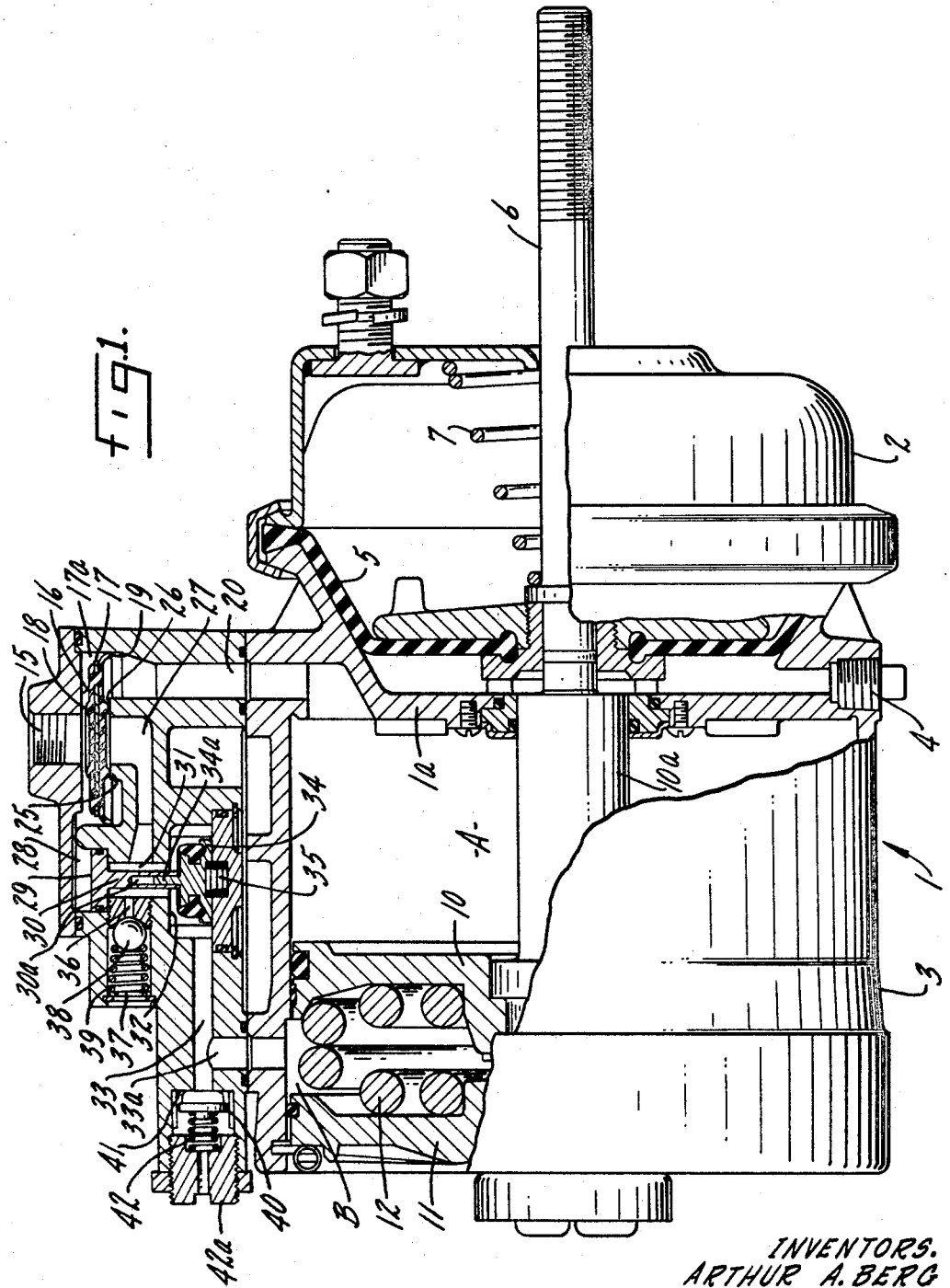
INVENTORS.
ARTHUR A. BERG
CHARLES HOROWITZ
BY Parker & Carter
Attorneys.

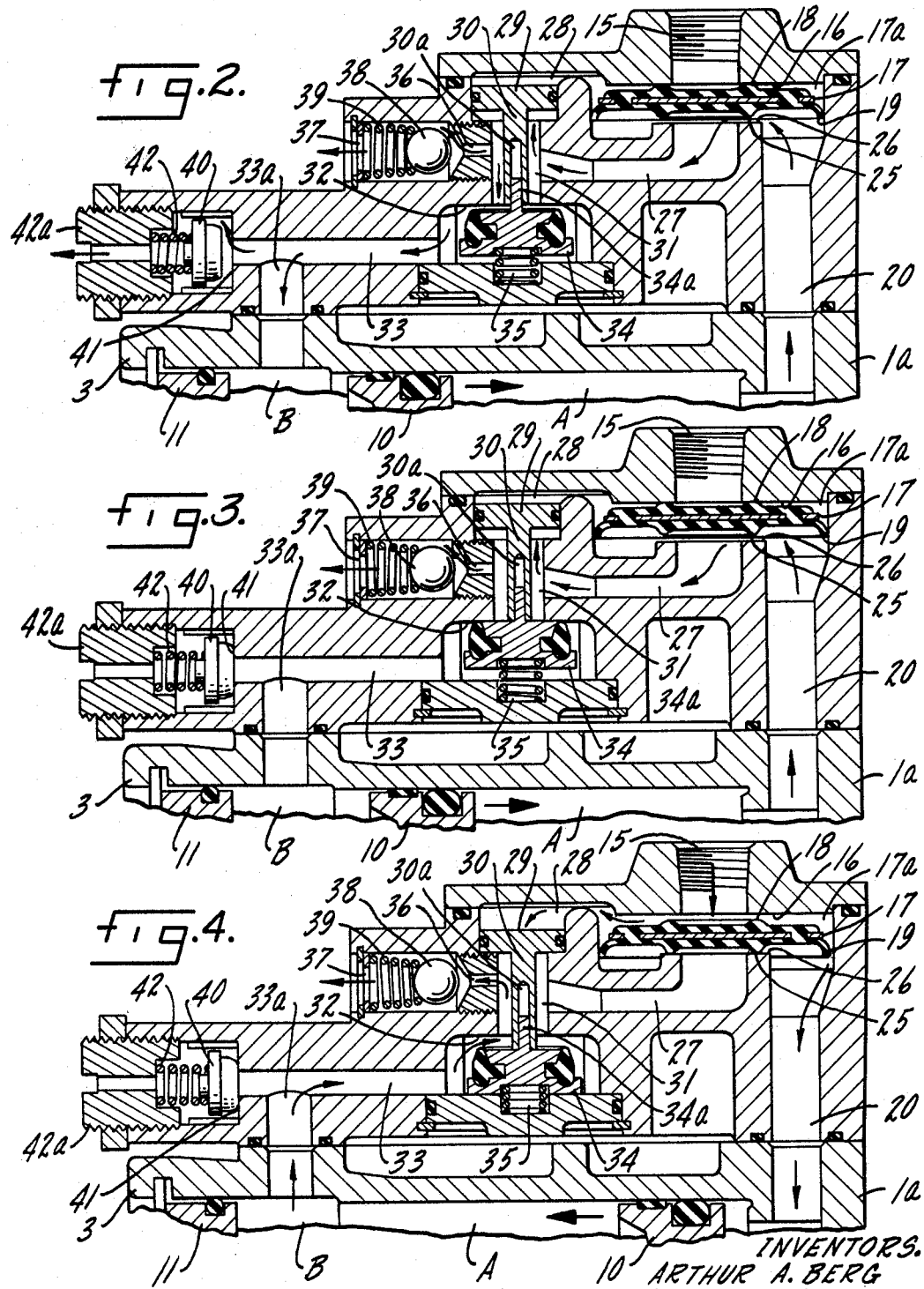

United States Patent Office 3,476,019
Patented Nov. 4, 1969

3,476,019
AIR-ASSISTED EMERGENCY SPRING BRAKE ASSEMBLY
Arthur A. Berg, Lincolnwood, and Charles Horowitz, Niles, Ill., assignors to Berg Mfg. & Sales Co., Des Plaines, Ill., a corporation of Illinois
Filed Sept. 8, 1967, Ser. No. 669,639
Int. Cl. F15b 11/10, 13/042
U.S. Cl. 91—420                                 26 Claims

ABSTRACT OF THE DISCLOSURE

An air-released, spring-operated brake actuator assembly having a first valve automatically responsive to differentials between pressures within and without the actuator to transfer air from one to the other side of an operating piston, a second valve automatically responsive to pressure differentials to trap and maintain a predetermined pressure on said other piston side to assist spring operation and a pair of check valves openable to atmosphere at different pressures.

SUMMARY OF THE INVENTION

A brake actuator having a piston dividing a housing into an air chamber and a spring chamber, a first valve responsive to pressures inside and outside said air chamber to transfer pressure from the air chamber to the spring chamber, a second valve responsive to said pressures and to pressures in said chambers and a pair of differential exhaust check valves, said second valve slidably connected to an actuator, said valves being effective to insure transfer to and maintenance of a predetermined pressure in said spring chamber for and during spring brake application, to assist said spring operation, to control and insure the release of air pressure from said spring chamber when said brake is released, and to release air pressure from said air chamber for brake application by said air-assisted spring.

This invention relates to brake actuators and has particular relation to an emergency spring brake actuator assembly.

Widely used on vehicles such as tractors and tractor-trailer combinations, emergency spring brake actuators include a housing divided by a movable wall, such as a piston, into an air chamber and a spring chamber. Air pressure is delivered to the air chamber to retract the piston, compress the spring and release the vehicle brake. If pressure be released from the air chamber, through a leak or break in the system or intentionally by the vehicle operator, positive, mechanical spring force is available to move the piston and brake the vehicle when it is moving, as well as to hold the brake on when the vehicle is parked. While air pressure is useful for intermittent brake application during vehicle operation, the tendency of air pressure to "bleed down" over a substantial period of parking substantially precludes the use of air pressure and requires a mechanical element, such as a spring, as means to insure a constant parking brake-applying force. At the same time, spring force diminishes as the spring expands and braking force requirements during vehicle movement increase with the weight and speed of the vehicle. Accordingly it is one purpose of the present invention to provide a brake actuator assembly capable of applying a combination of spring forces and a predetermined air pressure during brake operation of said actuator.

In United States Letters Patent No. 3,302,530 there is disclosed a means of transferring air pressure from an air to a spring chamber but said means is incapable of insuring application of a predetermined air pressure to the spring chamber and exhausting the air chamber to free the piston for rapid forward movement. It is thus another purpose to provide a brake actuator having the capability of trapping and maintaining a predetermined air pressure to assist the spring in the spring chamber while simultaneously exhausting the air chamber to reduce resistance to the forward movement of the piston in brake-applying direction.

Another purpose is to provide a brake actuator assembly automatically responsive to pressure differentials to transfer and maintain a predetermined substantial air pressure from an air chamber to a spring chamber during brake operation.

Another purpose is to provide a brake actuator assembly automatically responsive to pressure differentials to release air pressure from a spring chamber as air pressure is supplied to an air chamber.

Another purpose is to provide an emergency spring brake actuator assembly automatically responsive to pressure differentials to transfer a predetermined amount of air pressure from an air chamber to a spring chamber and to exhaust the remainder of said air pressure to atmosphere.

Another purpose is to provide an emergency spring brake actuator assembly having exhaust valves automatically openable at relatively different pressures.

Another purpose is to provide an emergency spring brake actuator having a restricted exhaust passage openable at a first pressure and a larger exhaust passage openable at another pressure.

Another purpose is to provide an emergency spring brake actuator assembly including a valve responsive to air pressure differentials in a spring chamber and an air chamber.

Another purpose is to provide an emergency spring brake actuator assembly including a valve responsive to pressure in an air chamber and a spring chamber and an actuator for said valve responsive to pressure in a vehicle air system.

Another purpose is to provide an emergency spring brake actuator assembly including a valve responsive to pressure in an air chamber and a spring chamber and an actuator for said valve responsive to pressure in a vehicle air system, and a sliding connection between said valve and said valve actuator.

Another purpose is to provide a brake actuator assembly capable of more rapid brake application at greater forces.

Other purposes will appear from time to time during the course of the specification and claims.

The invention is illustrated more or less diagrammatically in the accompanying drawings wherein:

FIGURE 1 is a side elevation in cross section;
FIGURE 2 is a detail view showing parts in another position;
FIGURE 3 is a detail view showing parts in a further position; and
FIGURE 4 is a detail view showing parts in a still further position.

Like parts are indicated by like numerals throughout the specification and drawings.

Referring now to the drawings, and particularly to FIGURE 1, the numeral 1 generally designates a brake actuator housing. The housing 1 has a forward normal or service brake housing part 2 and a rear emergency brake housing part 3 divided by a baffle wall 1a. Service air pressure is deliverable at inlet 4 to move diaphragm 5 and brake actuating rod 6 to apply the brakes of the vehicle in known manner. A spring 7 in housing part 2 returns the actuating rod and diaphragm to the positions shown in FIGURE 1 when are pressure is released at inlet 4.

A movable wall, taking the form of piston 10, is reciprocal in housing part 3 and divides the same into an air chamber A and a spring chamber B. Extension 10a extends through wall 1a for operating contact with rod 6. A plate 11 closes the rear of housing part 3 and a brake-applying spring 12 engages the inner surface of plate 11 and the rear surface of piston 10.

An air pressure inlet 15 has a valve seat 16 at its inner end. A valve member 17 has a valve face 18 positioned to seat upon the seat 16 and to close inlet 15. Valve member 17 has a one-way valve lip 19 engaging the wall of a valve chamber 17a and permitting air pressure to pass from inlet 15 into a passage 20 for delivery into chamber A to move piston 10 against spring 12 and to release the brake.

The valve 17 has a second valve face 25 movable against a seat 26 to close a passage 27 against communication with passage 20. A chamber 28 communicates one side of a piston 29 therein with inlet 15 when valve face 18 is off the seat 16. An extension 30 is formed on the opposite side of piston 29 and extends downwardly into a chamber 31 which in turn communicates with passage 27. Chamber 31 communicates through valve seat 32 with a passage 33 which, through branch passage 33a, communicates with chamber B. A valve member 34 is urged by spring 35 against seat 32 to close communication between chamber 31 and passage 33. Valve member 34 has an extension 34a slidably engaged in a well 30a formed in extension 30, the end surface of extension 30 engaging valve member 34 when the parts are in the position shown in FIGURE 1.

A restricted orifice 36 communicates chamber 31 with atmosphere through outlet 37 when a check valve 38 is moved out of closing engagement with orifice 36 in opposition to the spring 39.

Passage 33 is communicated with atmosphere when a check valve 40 is moved off its seat 41 against the action of spring 42.

The use and operation of the invention are as follows:

In normal operation air under pressure is supplied and withdrawn at inlet 4 to apply and release the service brakes intermittently as required during vehicle movement. Air under pressure is also supplied at inlet 15 under system pressure which may, for example, be of the order of 50 or 100 pounds. The air supplied at inlet 15 moves valve 17 into the position shown, for example, in FIGURE 1, i.e. to unseat the valve surface 18 from seat 16 and to seat valve surface 25 on seat 26. With the valve 17 so positioned, air supplied under pressure at inlet 15 passes by lip 19 and through passage 20 to fill chamber A and to move piston 10 against the action of spring 12 and into the release position illustrated in FIGURE 1. At the same time, air supplied under pressure at inlet 15 enters chamber 28 and moves piston 29 downwardly as the parts are shown, to open valve 34 through the mediacy of extension 30.

When air pressure diminishes at 15 the parts are automatically effective to transfer air pressure from chamber A to chamber B, to trap and maintain said air pressure in chamber B at a predetermined high level, to exhaust chamber A, freeing the piston 10 for rapid movement toward brake-applying position in response to the combination of air pressure in chamber B and the force of spring 12. The diminution of pressure at inlet 15 may be intentional on the part of the vehicle operator, it being understood that a suitable control valve (not shown) is available to the operator for control of fluid pressure at inlet 15. Said diminution may also occur as a result of a break or leak in the air system upstream of inlet 15. Intentional diminution of air pressure at inlet 15 may be accomplished by the operator during vehicle operation and also in order to set the vehicle brakes for parking.

Diminution of pressure at inlet 15 below a predetermined level results in an automatic disposition of parts as illustrated more or less diagrammatically in FIGURE 2.

If, for example, the system pressure be 50 p.s.i., the chamber A will be under 50 p.s.i. pressure at the time of said diminution. Brake application, whether during vehicle operation or for parking, may reduce the pressure at inlet 15, for example, to zero. When said pressure at inlet 15 falls below 50 p.s.i., the valve 17 automatically unseats from the seat 26 and seats upon the valve seat 16 to close the inlet 15 against any escape of pressure therethrough from the housing 1. The lip 19 is pressed against the walls of the chamber 17a to further close the inlet 15 and the chamber 28 against passage of pressure from chamber A thereinto. Upon unseating of valve face 25 from seat 26 air pressure within chamber A is delivered through passages 20 and 27 to the chamber 31. Said pressure is effective to open valve 34 against the action of spring 35 and to deliver said pressure to passages 33, 33a and to chamber B. Check valve 38 is urged by spring 39 into closing position against restricted orifice 36 at a relatively limited pressure of the order, say, of 3 p.s.i. Thus a portion of the air pressure from chamber A will bleed through the restricted orifice 36, unseating valve 38 and exhausting to atmosphere. Valve 40 is urged by spring 42 into closing position at a predetermined pressure substantially higher than that employed in connection with valve 38. A pressure of the order, say, of 30 p.s.i. has been found convenient and effective.

Since the elements 29, 34 are slidably engaged through extension 34a and the well 30a, it will be understood that valve 34 is openable in response to the pressure in chamber 31 independently of the position of member 29. Pressure entering chamber 31 raises piston 29 without closing valve 34. When the pressure in chamber B and the force of spring 35 together exceed the pressure in chamber 31, valve 34 will close. The pressure in chamber B is controlled by the setting of spring 42, rotatable spring retainer member 42a being provided for adjustment thereof. If said setting be arranged for opening of valve 40 at pressures above 30 p.s.i., it will be realized that the valve 40 will close and trap and maintain the pressure in chamber B at 30 p.s.i., valve 34 being also closed.

While pressure from chamber A bleeds through orifice 36 during transfer to chamber B, such bleeding has no appreciable affect on the transfer of sufficient pressure to provide the desired level in chamber B because orifice 36 is restricted to limit such bleeding. Pressure from chamber A will continue to exhaust through orifice 36, however, after valve 34 closes, orifice 36 not being so restricted as to create resistance to rapid exhaust of chamber A as piston 10 moves in brake-applying direction.

As is well known, the force exerted by a spring diminishes as the spring expands. The provision and maintenance of air pressure at a predetermined high level across the entire rear surface of piston 10 results in a continuing assistance to the action of spring 12 in moving the piston rapidly and forcefully in brake-applying direction. The automatic opening of valves 25, 34, 38 and 40 as piston 10 initiates its forward movement, as depicted in FIGURE 2 for example, provides for rapid egress of pressure from chamber A and substantially eliminates resistance to the forward movement of piston 10 under the influence of spring 12 and air pressure delivered to chamber B. Pressure will continue to exhaust through valve 38, as best seen in FIGURE 3, after valves 40 and 34 have closed, thus continuing to reduce such resistance. While valve 38 closes at 3 p.s.i., such pressure is relatively inconsequential in terms of resistance to movement of piston 10.

When the operator desires to release the emergency spring brake of the invention, air pressure is again supplied to inlet 15. Said air pressure moves valve 17 into the position shown in FIGURE 1, opening inlet 15 and closing passage 27. Said air pressure flows about lip 19 through passage 20 to fill chamber A and moves piston 10 rearwardly toward released position. Simultaneously it is important to remove resistance to the rearward movement of piston 10. This latter result is accomplished in automatic response to delivery of pressure at inlet 15, said pressure being delivered against member 29 to move the same downwardly, as the parts are shown in the drawings, onto the abutment surface or stop 29a. Through the mediacy of extension 30 said movement of member 29 is effective to open valve 34, as may be best seen for example in FIGURE 4. Rearward movement of piston 10, should it create a pressure in chamber B above the preset resistance of valve 40, will open valve 40 for rapid exhaust of said pressure down to the preset level of, say, 30 p.s.i. Such reduction would be insufficient, however, to provide the desired lack of resistance to movement of piston 10 toward release position and the open valve 34 provides for passage of fluid pressure from chamber B through the passages 33a and 33 into chamber 31 and through orifice 36 and valve 38 to atmosphere. Valve 38 will close when said pressure reaches the relatively low preset value of the order of 3 p.s.i. Such pressure is, however, considered relatively inconsequential in resisting the rearward movement of piston 10.

So long as system pressure is available at inlet 15 piston 29 will be held in the position shown in FIGURE 1 and valve 34 will be held in open position. Valves 38 and 40 will be in closed position and the device is in readiness for the next brake application in the manner described above.

Thus delivery of a predetermined level of air pressure to chamber B is assured. Said pressure is effective to assist the spring 12 in moving piston 10 and applying the brakes and in speeding said brake application. Chamber A is rapidly exhausted to reduce resistance to forward movement of piston 10 and chamber B is rapidly exhausted to reduce resistance to rearward movement of piston 10. The exhaust means provided do not interfere with the entrapment and maintenance of air-assist pressure in chamber B. While forward movement of piston 10 expands the area of chamber B, the pressure trapped in chamber B is effective throughout the expansion of spring 12 and the excursion of piston 10 in brake-applying direction, any diminishing of pressure resulting from said expansion of chamber B being relatively inconsequential and being provided for in the setting of springs 42 and 35.

There is claimed:

1. A brake actuator including a housing, a movable wall dividing said housing into an air chamber and a spring chamber, a spring engaging said wall in said spring chamber, an inlet connectable to a source of fluid pressure, a first passage for communicating said source inlet with said air chamber, a second passage for communicating said first passage with said spring chamber, a valve automatically movable in response to pressure differentials in said source and said first passage, said valve being movable into a first position to open communication between said source and said first passage and to close communication between said first and second passages, said valve being movable into a second position to close communication between said source and said first passage and open communication between said first passage and said second passages, and a second valve positioned to control communication between said second passage and said spring chamber.

2. The structure of claim 1 characterized by and including a second movable wall exposable on one side to pressure from said source and having an extension engagable with said second valve to open the same in response to delivery of fluid pressure from said source.

3. The structure of claim 2 wherein movement of said first valve into said second position closes communication between said second movable wall and said source.

4. The structure of claim 1 characterized by and including an exhaust passage communicating with said spring chamber and a valve closing said passage in response to pressure in said spring chamber below a predetermined level.

5. The structure of claim 1 characterized by and including a restricted exhaust orifice communicating with said second passage upstream of said second valve and a check valve closing said restricted exhaust orifice in response to pressures therein below a predetermined level.

6. The structure of claim 1 characterized by and including a first exhaust outlet communicating with said spring chamber, a first check valve closing said first exhaust outlet in response to air pressure in said spring chamber below a first predetermined level, a second exhaust outlet communicating with a portion of said second passage upstream of said second valve and a second check valve closing said second exhaust outlet in response to air pressure in said second passage portion below a second predetermined level.

7. The structure of claim 6 wherein said second predetermined level is substantially less than said first predetermined level.

8. A brake actuator including a housing, a first movable wall dividing said housing into an air chamber and a spring chamber, a spring engaging said wall in said spring chamber, an air pressure inlet for said housing, passage means for communicating said inlet with said air chamber and for communicating said air chamber with said spring chamber, a first valve automatically movable in response to pressure differentials between said inlet and said air chamber into a first position communicating said inlet with said air chamber and a second position communicating said air chamber with said spring chamber, a second valve controlling communication between said air chamber and said spring chamber, said second valve being automatically openable in response to excess pressure in said air chamber over the pressure in said spring chamber, an exhaust means upstream of said second valve and a second movable wall responsive to pressure at said inlet to open said second valve.

9. The structure of claim 8 characterized by and including a second exhaust means between said second valve and said spring chamber, said second exhaust means including a check valve openable to atmosphere in response to a predetermined pressure in said spring chamber.

10. The structure of claim 8 characterized by and including a slidable connection between said second movable wall and said second valve.

11. The structure of claim 8 characterized by and including yielding means effective to close said second valve in response to diminution of pressure in said air chamber below a predetermined level.

12. A brake actuator assembly including a housing, a movable wall dividing said housing into an air chamber and a spring chamber, a spring engaging said wall in said spring chamber, an air pressure inlet, a first pressure-responsive valve positioned to communicate alternatively said inlet with said air chamber and said air chamber with said spring chamber, a second valve between said first valve and said spring chamber and openable in response to excess pressure in said air chamber to communicate said air chamber with said spring chamber, and yielding means positioned to urge said second valve toward closed position.

13. The structure of claim 12 characterized by and including valve-operating means responsive to pressure at said inlet to open said second valve.

14. The structure of claim 13 characterized by and including a slidable connection between said valve-operating means and said second valve.

15. A brake actuator assembly including a housing, a fluid pressure chamber and a spring chamber in said housing, a movable wall between said chambers, a spring engaging said wall in said spring chamber, a fluid pressure source inlet, passage means in said housing, valve means associated with said passage means and responsive to fluid pressure differentials within said assembly alternatively to communicate said fluid pressure chamber with said source inlet and exhaust said spring chamber and to communicate said fluid pressure chamber with said spring chamber for delivery and maintenance of fluid pressure above a predetermined level within said spring chamber, said valve means including valve elements yieldingly urged into closed position to maintain said fluid pressure within said spring chamber.

16. The structure of claim 15 characterized by and including a valve actuator responsive to fluid pressure at said source inlet and having an actuating engagement with one of said last named valve elements.

17. The structure of claim 15 characterized by and including an exhaust outlet and a valve actuator responsive to fluid pressure at said source inlet and engagable with one of said valve elements to open the same to communicate said spring chamber with said exhaust outlet.

18. The structure of claim 17 characterized by and including a slidable connection between said actuator and said valve element to permit relative independent operation thereof.

19. In a brake actuator having a pair of chambers, a passage between said chambers, a first exhaust outlet in said passage, a second exhaust outlet in said passage, a valve member yieldingly urged toward a position closing said passage between said outlets, a first check valve closing said first exhaust outlet and openable in response to fluid pressure above a first predetermined level, a second check valve closing said second exhaust outlet and openable in response to fluid pressure above a second predetermined level.

20. The structure of claim 19 wherein one of said outlets has a diameter substantially less than that of said passage.

21. The structure of claim 19 wherein one of said predetermined levels is of the order of ten times the other of said predetermined levels.

22. The structure of claim 19 characterized by and including an actuator slidably connected to said valve member, a source of fluid pressure communicating with said actuator, said actuator being movable in response to pressure from said source to move said valve member into open position.

23. A brake actuator including a first chamber and a second chamber, a passage between said chambers, a valve member yieldingly urged into a position closing said passage, said valve member being openable in response to fluid pressure in said first chamber in excess of pressure of pressure in said second chamber, an inlet for air pressure, an actuator slidably connected with said valve member and responsive to pressure from said inlet to move said valve member into open position.

24. The structure of claim 23 characterized by and including a restricted exhaust outlet communicating with said passage between said first chamber and said valve member, and a check valve yieldingly urged into a position closing said outlet.

25. The structure of claim 23 characterized by and including an exhaust outlet communicating with said passage between said spring chamber and said valve member and a check valve closing said outlet.

26. A brake actuator assembly including a housing, a movable wall dividing said housing into a fluid pressure chamber and a spring chamber, a spring engaging said wall in said spring chamber, valve means positioned to direct fluid pressure into said fluid pressure chamber to move said wall in one direction against the action of said spring and directing fluid pressure at a predetermined level into said spring chamber to assist the movement of said wall in the opposite direction in cooperation with the action of said spring and exhaust means openable at relatively different pressures and selectively communicable with said chambers to exhaust one or the other of said chambers.

References Cited
UNITED STATES PATENTS

| | | | |
|---|---|---|---|
| 736,302 | 6/1902 | Sarver | 91—438 |
| 2,895,454 | 7/1959 | Tibb et al. | 91—438 |
| 3,006,323 | 10/1961 | Tilney | 91—439 |
| 3,302,530 | 2/1967 | Dabrikin | 91—439 |

PAUL E. MASLOUSKY, Primary Examiner

U.S. Cl. X.R.

91—438, 446, 452